US011196830B2

(12) United States Patent
Desai et al.

(10) Patent No.: US 11,196,830 B2
(45) Date of Patent: Dec. 7, 2021

(54) DELIVERING MESSAGES TO OFFLINE DEVICES USING PEER-TO-PEER COMMUNICATION

(71) Applicant: International Business Machines Corporation, Armonk, NY (US)

(72) Inventors: Nirmit V. Desai, Yorktown Heights, NY (US); Shahrokh Daijavad, Morgan Hill, CA (US); Catherine H. Crawford, Carmel, NY (US); Steven E. Millman, Spring Valley, NY (US); Heather D. Achilles, Gilmanton, NH (US); Carmelo I. Uria, Boise, ID (US); Peter F. Mycue, Newport, NC (US); Wendy Chong, Carmel, NY (US); Adam E. Grant, Duluth, GA (US); Randy M. Fussell, Atlanta, GA (US); Christopher P. Huff, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/894,394

(22) Filed: Feb. 12, 2018

(65) Prior Publication Data

US 2019/0253508 A1 Aug. 15, 2019

(51) Int. Cl.
*H04L 29/08* (2006.01)
*H04W 84/18* (2009.01)

(52) U.S. Cl.
CPC ............ *H04L 67/26* (2013.01); *H04L 67/104* (2013.01); *H04W 84/18* (2013.01)

(58) Field of Classification Search
CPC ....... H04L 67/26; H04L 67/104; H04L 63/08; H04L 9/3247; H04L 9/30; H04L 65/4076;
(Continued)

(56) References Cited

U.S. PATENT DOCUMENTS

| 6,947,908 B1* | 9/2005 | Slater ..................... G06Q 20/04 705/50 |
| 7,263,379 B1* | 8/2007 | Parkulo .................. G08B 21/02 340/501 |

(Continued)

OTHER PUBLICATIONS

Xian W., Maciej M., hen C., Nirvana M., Emergency Message Dissemination System for Smartphones During Natural Disasters, 2011, Electrical Engineering, Mathematics and Computer Science University of Twente, NL. (Year: 2011).*

(Continued)

*Primary Examiner* — Hitesh Patel
*Assistant Examiner* — Alex H. Tran
(74) *Attorney, Agent, or Firm* — Garg Law Firm, PLLC; Rakesh Garg; Peter Edwards

(57) ABSTRACT

A notification message is received by a communication device The notification message includes a message identifier and a digital signature generated by an original sender of the notification message. That an integrity of message content in the notification message and an original sender of the notification message is verified is determined using the digital signature. Responsive to determining that the notification message is verified, the notification message is forwarded by the communication device using a peer-to-peer communication channel over a mesh network.

19 Claims, 6 Drawing Sheets

(58) Field of Classification Search
CPC .............. H04W 84/18; H04M 17/305; H04M 2017/2531; H04N 21/43637
See application file for complete search history.

(56) References Cited

U.S. PATENT DOCUMENTS

| | | | | |
|---|---|---|---|---|
| 7,634,813 B2* | 12/2009 | Costa | .................... | G06F 21/554 726/25 |
| 9,369,331 B1* | 6/2016 | Gill | .................... | H04L 29/06 |
| 9,999,083 B1* | 6/2018 | Bostick | ................ | H04W 76/14 |
| 10,165,047 B2* | 12/2018 | Smith | ................ | H04L 67/1068 |
| 2002/0188942 A1* | 12/2002 | Bryan | .................... | G06F 8/63 717/176 |
| 2005/0169285 A1* | 8/2005 | Wills | .................... | H04L 69/08 370/401 |
| 2005/0250445 A1* | 11/2005 | Hansson | ................ | H04L 51/00 455/41.2 |
| 2008/0151916 A1* | 6/2008 | Jetcheva | ................ | H04L 45/44 370/401 |
| 2009/0122774 A1* | 5/2009 | Seok | .................... | H04L 47/826 370/338 |
| 2009/0310516 A1* | 12/2009 | Goel | .................... | H04L 45/16 370/254 |
| 2010/0094953 A1* | 4/2010 | Kwon | ................ | H04L 67/325 709/219 |
| 2010/0124196 A1* | 5/2010 | Bonar | ................ | H04B 7/0689 370/329 |
| 2010/0279647 A1* | 11/2010 | Jacobs | .................... | H04W 4/90 455/404.1 |
| 2011/0282961 A1* | 11/2011 | Montemurro | ....... | H04W 12/068 709/207 |
| 2012/0033616 A1* | 2/2012 | Sun | .................... | H04L 67/04 370/328 |
| 2013/0110920 A1* | 5/2013 | Broustis | ................ | H04L 63/04 709/204 |
| 2013/0182848 A1* | 7/2013 | Sundaram | ............. | H04L 9/3073 380/277 |
| 2014/0030982 A1* | 1/2014 | Cardona | ................ | G01S 11/06 455/67.11 |
| 2014/0075220 A1* | 3/2014 | Song | .................... | G06F 1/3212 713/320 |
| 2014/0362768 A1* | 12/2014 | Wood | .................... | H04L 67/322 370/328 |
| 2014/0370811 A1* | 12/2014 | Kang | .................... | H04W 84/18 455/41.2 |
| 2015/0181515 A1* | 6/2015 | Onohara | ............... | H04W 48/18 455/509 |
| 2016/0019496 A1* | 1/2016 | Gorlin | ................... | H04L 67/104 705/333 |
| 2016/0072865 A1* | 3/2016 | Kaplinger | ........... | H04L 67/1097 709/213 |
| 2016/0119867 A1* | 4/2016 | Garg | ................ | H04W 52/0206 370/311 |
| 2016/0255502 A1* | 9/2016 | Rajadurai | ............. | H04L 9/0825 713/171 |
| 2016/0286367 A1* | 9/2016 | Mashhadi | ............... | H04L 67/26 |
| 2017/0339536 A1* | 11/2017 | Lewis | .................... | H04W 4/80 |
| 2017/0359799 A1* | 12/2017 | Karimli | .............. | H04W 56/002 |
| 2018/0131781 A1* | 5/2018 | Vangala | ............. | H04W 68/005 |
| 2018/0324122 A1* | 11/2018 | Schwartz | .................. | G06F 9/54 |
| 2019/0068382 A1* | 2/2019 | Theodore | ............ | H04L 63/0869 |
| 2019/0207819 A1* | 7/2019 | Sathya | .................. | H04W 24/08 |

OTHER PUBLICATIONS

Lerner et al.; Rangzen: Anonymously Getting the Word Out in a Blackout, Dec. 11, 2016.
Wu et al; Emergency Message Dissemination System for Smartphones During Natural Disasters, IEEE, 2011.
Pelusi et al; Opportunistic Networking: Data Forwarding in Disconnected Mobile Ad Hoc Networks, IEEE Communications Magazine, Nov. 2006.

* cited by examiner

DELIVERING MESSAGES TO OFFLINE DEVICES USING PEER-TO-PEER COMMUNICATION

TECHNICAL FIELD

The present invention relates generally to a method, system, and computer program product for delivering messages to offline devices. More particularly, the present invention relates to a method, system, and computer program product for delivering messages to offline devices using peer-to-peer communication.

BACKGROUND

A large number of people, especially in developing countries, do not have reliable and affordable Internet connectivity even though they may be smartphone users (either via home or office Internet connection or via cellular data connection). Further, even for those people that have connectivity, the WiFi and Cellular networks often become congested with a large number of users in certain environments such as sports arenas, theme parks, conferences, exhibitions, cruise ships, disaster zones and other public places. In addition, due to the economics involved users tend to rely upon WiFi connectivity and minimize the cost of consuming cellular data, even when cellular infrastructure is available. These users frequently move in and out of authorized WiFi network connectivity.

A majority of the modern software applications are deployed as mobile apps with backend cloud services. A critical component in a large number of such applications is the sending of push notification by the cloud services to the mobile applications. These notifications can target specific users or devices based on a variety of qualifying attributes and notify the user even when the user is not actively engaged with the respective application. Hence, push notifications play a major role in notifying target user populations in a timely and context-sensitive fashion. However, such push notifications rely on the user device having continuous Internet connectivity. Given the above-described connectivity challenges, the notifications may reach only a fraction of the target population of users. In the case of critical applications such as severe weather alerts, such a limitation can have potentially life-threatening consequences.

SUMMARY

The illustrative embodiments provide a method, system, and computer program product. An embodiment of a method includes receiving, by communication device, a notification message. In the embodiment, the notification message includes a message identifier and a digital signature generated by an original sender of the notification message. The method further includes determining that an integrity of message content in the notification message and an original sender of the notification message is verified using the digital signature. The method further includes forwarding, responsive to determining that the notification message is verified, the notification message by the communication device using a peer-to-peer communication channel over a mesh network.

In an embodiment, the notification message further includes an application identifier generated by the original sender, the application identifier associated with an application of the communication device. In another embodiment, determining that the notification message is intended for the application based upon the application identifier, wherein the determining that the integrity of message content is verified is responsive to the determining that the notification message is intended for the application.

An embodiment further includes determining that the notification message is a duplicate of a previously received notification message based upon the message identifier. An embodiment further includes discarding the notification message responsive to determining that the notification message is a duplicate of a previously received notification message.

An embodiment further includes determining that the notification message has not previously been received based upon the message identifier, and marking the notification message as received. In an embodiment, the notification message further includes at least one message attribute, the at least one message attribute specifying qualifying attributes of an intended recipient of the notification message. In an embodiment, the at least one attribute is determinative of whether the notification message is to be forwarded.

An embodiment further includes determining that the notification message is not to be forwarded based upon the at least one message attribute, and discarding the notification message. In an embodiment, the at least one message attribute includes at last one of a specified duration of the notification message, a number of devices that have previously broadcast the notification message, and a specified geographical distance of the notification message from a location of a first recipient of the notification message.

An embodiment further includes receiving, previous to receiving the notification message, an indication of an expected time window of receiving the notification message, and adjusting at least one of a frequency for discovery of the notification message and a frequency of forwarding of the notification message based upon the expected time window.

An embodiment further includes determining the peer-to-peer communication channel based upon at least one of a size of the notification message, an expected latency of the notification message, a type of data contained in the notification message, and a remaining battery power of the communication device.

An embodiment further includes displaying the message content of the notification message. An embodiment further includes dynamically adjusting at least one of a frequency for discovery of the notification message and a frequency of forwarding of the notification message to conserve power of the communication device. In an embodiment, the original sender includes a source server. In an embodiment, the communication device is a mobile device.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
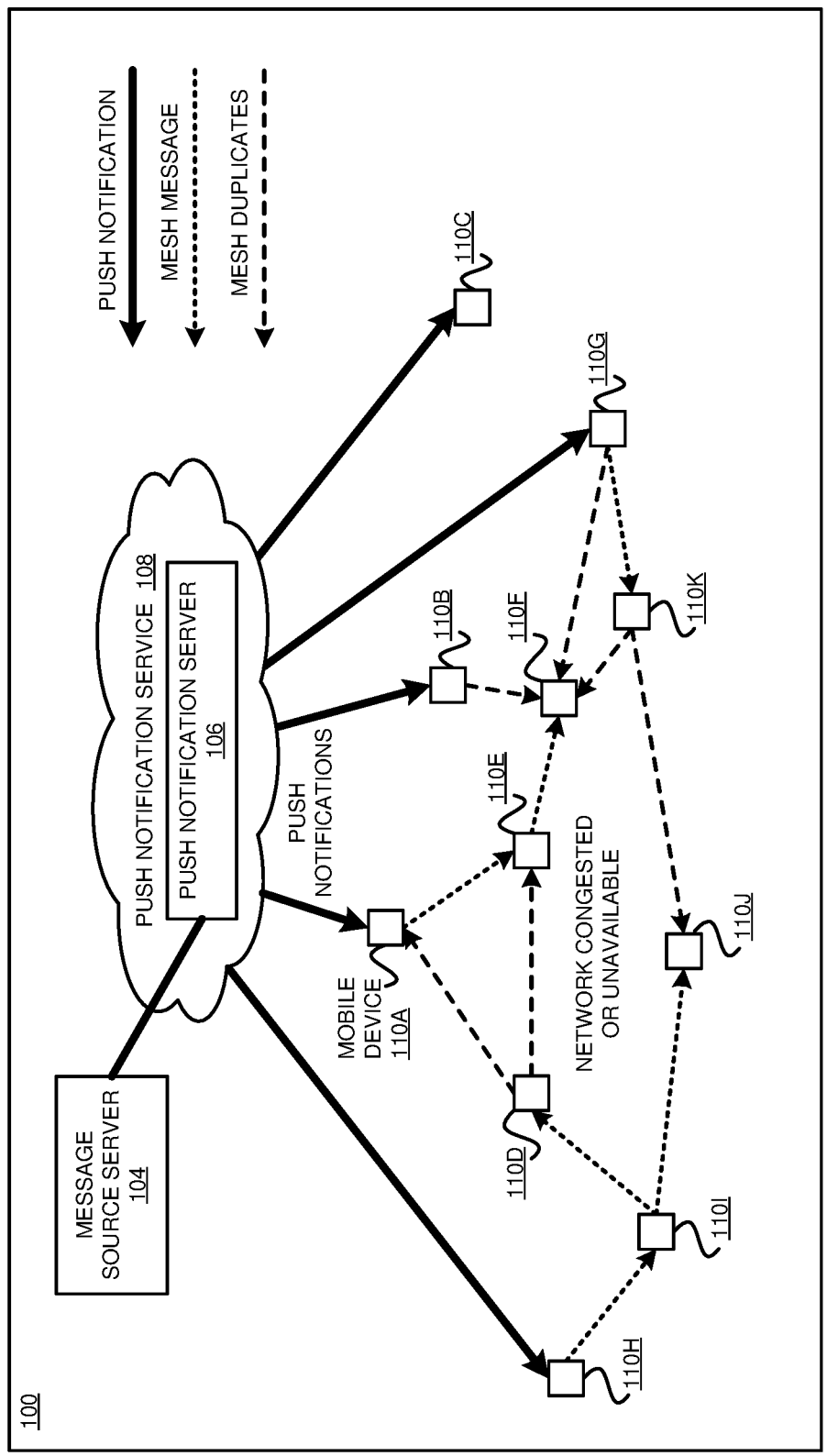
FIG. 1 depicts a block diagram of a communication network of data processing systems in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other problems related to delivering messages to offline devices. In one or more embodiments, offline devices include devices that are not currently connected to the Internet but possess other radio channels available for communication with peer devices such as WiFi or Bluetooth.

Typically, push notifications exclusively rely on Internet connectivity and target devices do not receive push notifications if they happen to be offline. Furthermore, most push notification services allow only one notification to be active at a time for an application.

Mobile peer-to-peer networking applications rely on devices originating messages that are broadcast or unicast to other peer devices. These applications are motivated by a different set of problems in that they offer completely "off-the-grid" messaging as they aim to address the issue of lack of trust in government-run infrastructures, or offer point-to-point messaging that is confidential so that message contents cannot be extracted by eavesdropping devices, relayed back to a cloud services, and aggregated.

Neither of these approaches can be readily applied in offering offline push notifications due to some fundamental challenges. To protect against the spread of misinformation in the open peer-to-peer networks, it is important that the receiving devices are able to verify that the message was originally sent by a trusted cloud service and that the message contents have not been modified en route. However, each device is a potential sender which requires distribution of public keys of all potential senders to all the devices. Such massive distribution is challenging primarily due to the ad hoc nature of the peer-to-peer channels and absence of a global repository of all participating devices and their public keys. Even if the distribution problem is solved, a malicious peer can distribute its public key and start broadcasting misinformation such as a fake tornado alert, and the receiving peers have no way of knowing whether the sender can be trusted. Receiving peers can identify the sending peer as well as verify that the message contents have not been modified. However, they have no fool-proof mechanism to determine whether the information from the sending peer can be trusted.

For usability, a device should be able to detect duplicate messages so that the user is not shown a message more than once. However, since multiple peers may generate a message with same information and assign different IDs to the messages before broadcasting them, to a receiving peer they appear as unique messages although the content of the message is the same. As a result, the same content may be shown to the user multiple times.

Various embodiments described herein leverage peer-to-peer networking techniques combined with integrity and identity of such notifications to propagate push notifications to devices having no Internet connectivity. In particular embodiments, the procedures described herein can be applied to propagate push notifications pertaining to weather information, targeted marketing offers, road and traffic information, live scores in a sports venue, and other information.

One or more embodiments take advantage of a cloud service as the only origin of messages, such as in the case of push notifications, but expands the reach of these notifications to offline devices by leveraging peer-to-peer channels among devices such as mobile devices. In the embodiment, a subset of the devices having Internet connectivity receives push notifications from a server that have originated at a backend server, such as a cloud backend server, using a client application installed on the device. In the embodiment, each of these devices leverages peer-to-peer channels available on the device to further forward the message one or more times to peer devices in their proximity. The devices in the proximity may include devices not having Internet connectivity.

In the embodiment, each application installed on the mobile devices trusts its corresponding cloud backend, and as the cloud backend can be the only originator of new messages, the integrity of the message and sender identity is verified via digital signatures attached to each message. Further, in one or more embodiments, the cloud service assigns a unique message identifier (ID) to enable a peer device to uniquely identify each message generated by the cloud service. If a device receives the same message twice, the device can identify the message as a duplicate because the messages have identical message IDs.

In an embodiment, a mobile application is distributed to multiple mobile devices. In particular embodiments, the mobile application includes a public key corresponding to a private key held by a cloud service configured to generate messages, and a mesh networking software library or software development kit (SDK) enabling mesh network communication between the mobile device and other peer mobile devices. In the embodiment, the cloud service generates a message, assigns a message ID to the message, digitally signs the message using the private key, and sends a request to a notification server requesting the notification server to broadcast the message to one or more mobile devices having the client application. In one or more embodiments, the message may include a variety of data such as, but not limited to, text, images, audio, video, sensor readings, and push notifications. In particular examples, the message may include a severe weather alert, a targeted marketing notification, lives scores in a congested sport arena, weather data from personal weather stations, or road and traffic condition broadcasts.

Each mobile device may include multiple client applications, each leveraging the mesh networking library or SDK as well as traditional Internet connectivity (when available) simultaneously. In the embodiment, a subset of the peers with Internet connectivity receive the message from the notification server using, for example, a cellular network connection, and verify the integrity of the message. In particular embodiments, the mobile device verifies the digital signature of the message using the public key. If a mobile device verifies the message, the message ID is marked as "received", and the mobile device forwards the message over a mesh network with the original ID and signature. In particular embodiments, the mobile device may use one or more of Wifi or Bluetooth protocols to forward the message. In a particular embodiment, the mobile device may forward the message using a unicast protocol. In other particular embodiments, the mobile device may forward the message using a broadcast protocol to forward the message to multiple recipients.

In the embodiment, the message is received by one or more peer mobile devices within a proximity of the forwarding mobile device. In the embodiment, each receiving mesh peer mobile device checks that the message ID has not been "received" before and verifies the signature of the message using the public key. If the peer mobile device verifies that the message as valid and determines that the message is new, the peer mobile device marks the message ID as "received" and forwards the message over the mesh network with the original message ID and signature. Accordingly, in one or more embodiments, the message is distributed to other mobile devices even if the particular mobile device does not currently have direct connectivity with the Internet.

In one or more embodiments, a mobile devices are configured to detect duplicate messages based upon the message ID and discard message that have been previously received by the mobile device. In one or more embodiments, the message includes message attributes that specify qualifying attributes of targeted recipient devices, such as location or mobility of the mobile device, and the recipient mobile device determines if it is an intended recipient of the received message. In another embodiment, a mobile device is configured to dynamically adjust the frequency of discovery of messages and/or frequency of forwarding of messages in order to minimize battery consumption of the mobile device.

In one or more embodiments, the message source server may be configured to send an indication of upcoming messages at an expected time in the future using a "heads up" message. For example, if severe weather is expected at a certain time in the future, such as expected severe weather in the afternoon or expected landfall of a hurricane in the future, a mobile device can receive an indication of a time window for which the messages can be expected. In the embodiment, the mobile device can adjust, e.g., increase, the frequency for discovery and/or forwarding based upon the expected time window to expedite propagation of the messages when the messages arrive.

In one or more embodiments, a mobile device is configured to not forward a message to peer mobile devices after a specified duration of time from the time of generation of the original message. In other embodiments, a mobile device is configured to not forward a message to peer devices after the message has been forward by a specified number of devices. In other embodiments, a mobile device is configured to not forward a message to peer devices after the message has traveled a specified geographical distance from a location of a first recipient of the message.

In one or more embodiments, a mobile device is configured to dynamically choose a peer-to-peer channel suitable for a given message based upon a size of the message, and expected latency of the message, the type of data contained in the message, or remaining battery power of the mobile device.

In another embodiment, various mobile devices within an area may be configured with different client applications associated with receiving push notifications from different cloud counterpart applications and still be able to forward the messages to other peer mobile devices. For example, each mobile device running an Application X associated with a cloud server X and receiving a message intended for application X is able to verify the integrity of the message content, an identity of the original sender, and detect duplicate messages. Each mobile device not running Application X, such as mobile devices running an Application Y associated with a cloud service Y, are able to receive the messages intended for Application X and forward the message intended for Application X to other peers without being required to verify the message.

In another embodiment, the mobile devices may utilize various unicast protocols available on the devices using the WiFi or Bluetooth capabilities. When using such unicast protocols, a mobile device may send a message to exactly one peer at a time. In another embodiment, when forwarding a message over a unicast protocol, a mobile device may employ various optimization techniques to decide which peer to connect and which messages to send to them. In one example optimization, on receiving a message, a device may store identities of all peer devices that forwarded the message starting with the cloud service. The device may then decide to not send the message back to one or more of these forwarding devices, given that they already must have the message.

An embodiment can be implemented as a software application. The application implementing an embodiment can be configured as a modification of an existing message notification system as a separate application that operates in conjunction with a message notification system, a stand-alone application, or some combination thereof.

The illustrative embodiments are described with respect to certain types of messages, notifications, transmissions, requests, validations, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
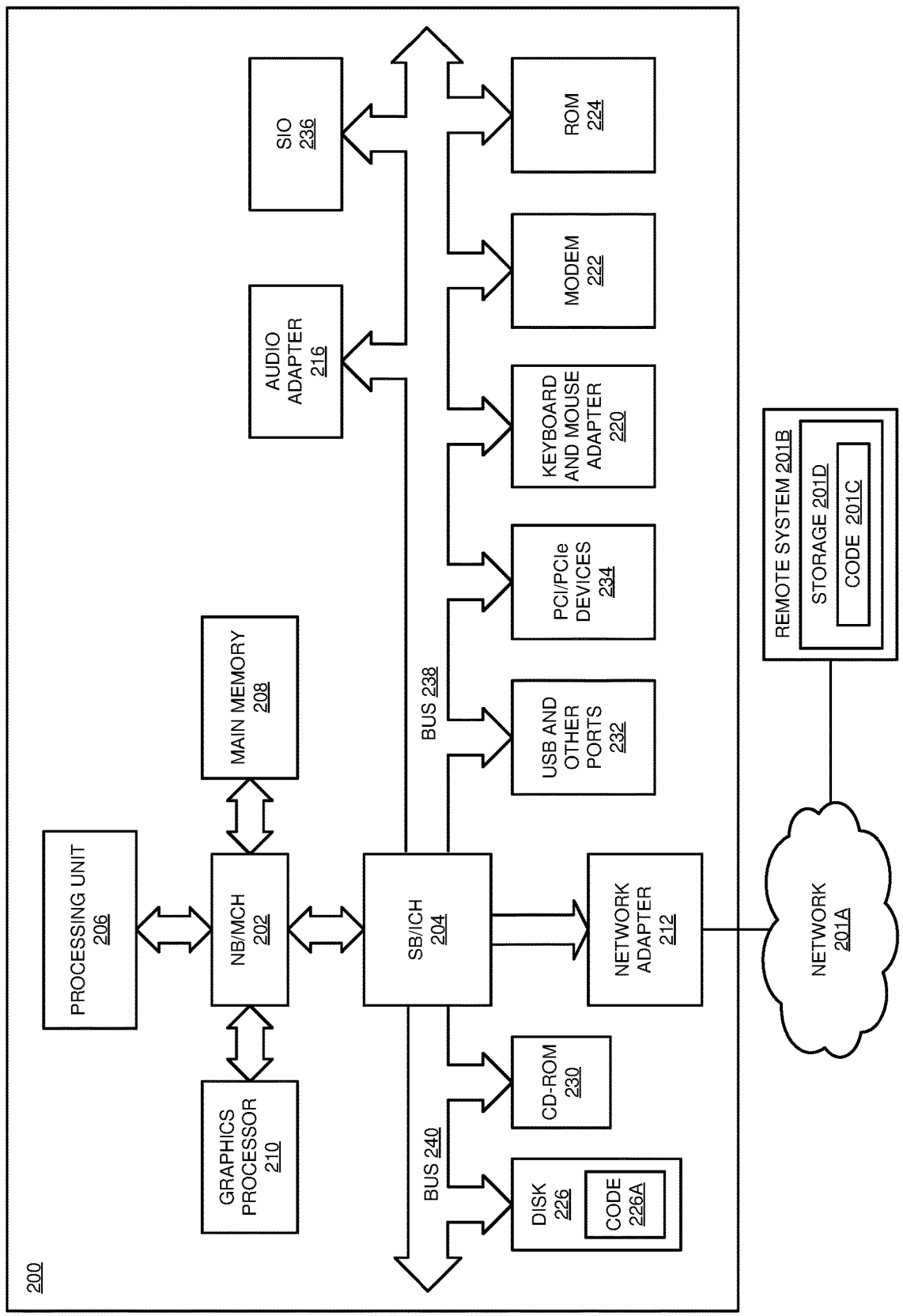
FIG. 2 depicts a block diagram of a data processing system in which illustrative embodiments may be implemented.

With reference to the figures and in particular with reference to FIGS. 1 and 2, these figures are example diagrams of communication and data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a communication network of data processing systems in which illustrative embodiments may be implemented. Communication network 100 is a network of computers in which the illustrative embodiments may be implemented. Communication network 100 include one or more networks used to provide communications links between various devices and computers connected together within communication network 100. Communication network 100 may include connections, such as wire, wireless communication links, or fiber optic cables.

Clients or servers are only example roles of certain data processing systems connected to network 100 and are not intended to exclude other configurations or roles for these data processing systems. Message source server 104 is in communication with push notification server 106 of a push notification service 108 via a network connection. In particular embodiments, message source server 104 is a back-end server of a message provider. Software applications may execute on any computer in communication network 100. Communication network 100 further includes a number of mobile devices 110A-110K. In the particular embodiment illustrated in FIG. 1, mobile device 110A, mobile device 110B, mobile device 110C, and mobile device 110H are in communication with push notification server 106 via a cellular communication network whereas mobile device 110D, mobile device 110E, mobile device 110F, mobile device 110F, mobile device 110I, mobile device 110K and mobile device 110K are located in an area in which a connection to the cellular communication network is congested or unavailable.

In one or more embodiments, message source server 104 generates a notification message and sends a request to broadcast the notification message to push notification server 106. In the embodiment, push notification server 106 sends a push notification of the message to mobile device 110A, mobile device 110B, mobile device 110C, mobile device 110G, and mobile device 110H via the cellular communication network. Upon receiving and verifying the message, each of mobile device 110A, mobile device 110B, mobile device 110C, mobile device 110G, and mobile device 110H forwards the notification message using a mesh network, such as one or more of peer-to-peer protocols using WiFi or Bluetooth components, to mobile devices within proximity. For example, mobile device 110A may forward the notification message by a peer-to-peer mesh network and mobile device 110E may receive the notification message. Mobile device 110E may further validate the message and forward the message using the mesh network such that the message is received by mobile device 110F. Certain mobile devices may receive duplicates of the message and be configured to ignore the duplicates after receiving the message for the first time.

Only as an example, and without implying any limitation to such architecture, FIG. 1 depicts certain components that are usable in an example implementation of an embodiment. For example, servers 104 and 106, and mobile devices 110A-110K are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Mobile devices 110A-110K can take the form of a smartphone, a tablet computer, a laptop computer, a client in a stationary or a portable form, a wearable computing device, a drone, or any other suitable device. Any software application described as executing in another data processing system in FIG. 1 can be configured to execute in mobile device 110A-110K in a similar manner. Any data or information stored or produced in another data processing system in FIG. 1 can be configured to be stored or produced in mobile device 110A-110K in a similar manner.

Message source server 104, push notification server 106, and/or mobile devices 110A-110K may include one or more applications to implement an embodiment described herein. Message source server 104 and push notification server 106 may be in communication using wired connections, wireless communication protocols, or other suitable data connectivity.

In the depicted example, Communication network 100 may include a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, communication network 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, communication network 100 may be used for implementing a client-server environment in which the illustrative embodiments may be implemented. A client-server environment enables software applications and data to be distributed across a network such that an application functions by using the interactivity between a client data processing system and a server data processing system.

Communication network 100 may also employ a service oriented architecture where interoperable software components distributed across a network may be packaged together as coherent business applications. Communication network 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or mobile devices 110A-110K in FIG. 1, or another type of device in which computer usable program code or instructions implementing the processes may be located for the illustrative embodiments.

Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device, or drone, in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
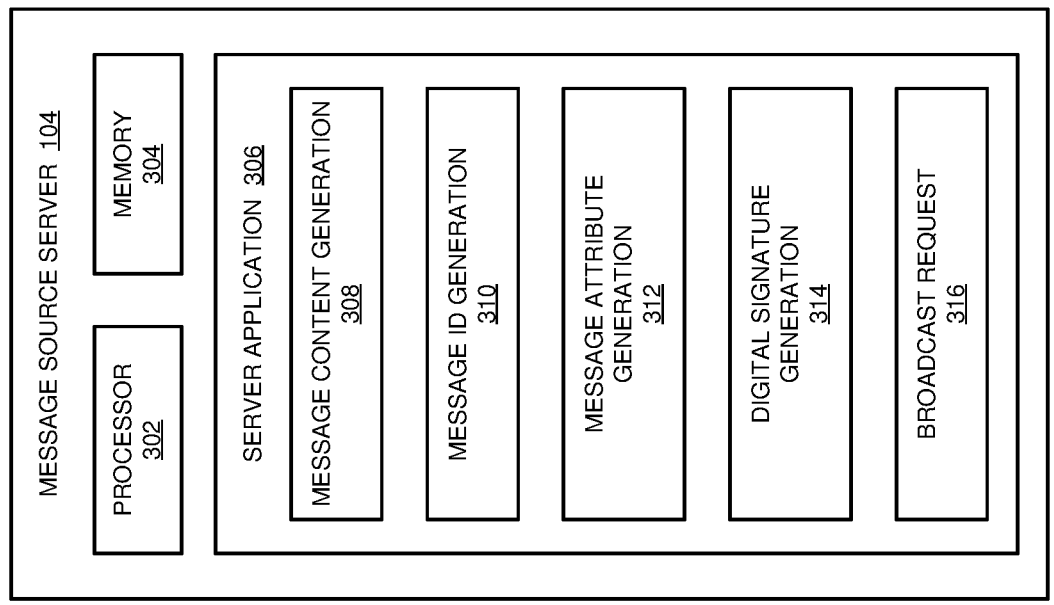
FIG. 3 depicts a block diagram of an example configuration of a server for delivering messages to offline devices using peer-to-peer communication.

With reference to FIG. 3, this figure depicts a block diagram of an example configuration of a server for delivering messages to offline devices using peer-to-peer communication. Message source server 104 is an example of message source server 104 of FIG. 1 and includes a processor 302, a memory 304, a server application 306. Processor 302 is configured to retrieve instructions from memory 3-4 and execute the instructions to perform various operations of message source server 104 as described herein.

Server application 306 includes a message content generation component 308, a message ID generation component 310, a message attribute generation component 312, a digital signature generation component 314, and a broadcast request component 316. Server application 306 is configured to perform operations associated with delivering messages to offline devices using peer-to-peer communication as described herein. Message content generation component 308 is configured to generate message content, such as an emergency notification, that is desired to be broadcast in a message to one or more mobile devices as described herein. Message ID generation component 310 is configured to generate a unique identifier (ID) for the message as described herein.

Message attribute generation component 312 is configured to generate one or more attributes associated with the message as described herein. In particular embodiments, the one or more attributes may include an expiration time or geographic location associated with the message as described herein. Digital signature generation component 314 is configured to generate a digital signature for the message based upon the message and a private key held by message source server 104, and append the digital signature to the message as described herein. Broadcast request component 318 is configured to send a broadcast request including the message to a server, such as push notification server 106, requesting the server to broadcast the message to one or more mobile devices such as one or more of mobile devices 110A-110K.

Figure 4:
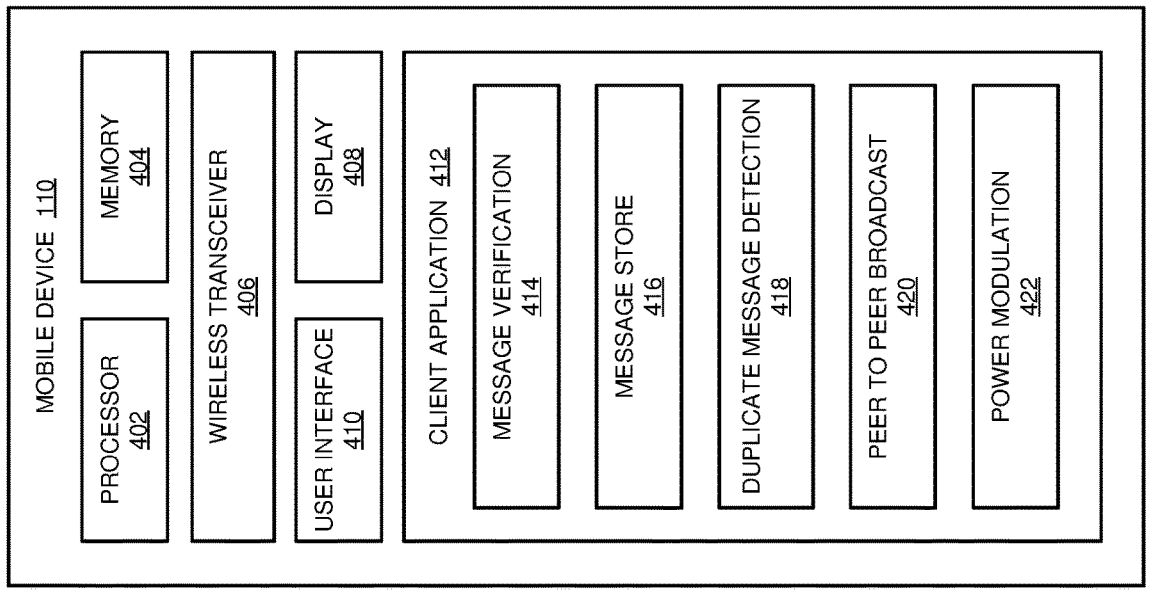
FIG. 4 depicts a block diagram of an example configuration of a mobile device for delivering messages to offline devices using peer-to-peer communication.

With reference to FIG. 4, this figure depicts a block diagram of an example configuration of a mobile device for delivering messages to offline devices using peer-to-peer communication. Mobile device 110 is an example of one or more of mobile devices 110A-110K of FIG. 1 and includes a processor 402, a memory 404, a wireless transceiver 406, a display device 408, a user input device 410, and a client application 412. Processor 402 is configured to retrieve instructions from memory 404 and execute the instructions to perform various operations of mobile device 110 as described herein. In one or more embodiments, wireless transceiver 406 is configured to communicate wirelessly using cellular communication radio channels as well as other radio channels suitable for a mesh network such as WiFi or Bluetooth. In one or more embodiments, display device 408 is configured to display message content such as content from a notification message to a user of mobile device 110. In one or more embodiments, user input device 410 is configured to provide one or more input devices to allow a user to interact with mobile device 110.

Client application 412 includes a message verification component 414, a message store 416, a duplicate message detection component 418, a peer-to-peer broadcast component 420, and a power modulation component 422. Message verification component 414 is configured to verify a received message using the digital signature of the message and a public key held by client application 412 that corresponds to the private key held by message content server 104. Message store component 416 is configured to store one or more messages received by mobile device 110. Duplicate message detection component 418 is configured to determine if a received message is a duplicate of a previously received message based upon determining whether the message ID of the received message matches a message ID of a previously received message. Peer-to-peer broadcast component 420 is configured to forward a message to other mobile devices in the proximity using a peer-to-peer mesh network as described herein. In particular embodiments, mobile device 110 uses one or more of a WiFi broadcast or a Bluetooth broadcast to broadcast the message. In other particular embodiments, mobile device 110 uses a WiFi protocol or a Bluetooth protocol to forward the message using unicast. Power modulation component 422 is configured to adapt the frequency of forwarding of messages and/or the frequency of discovery of messages to conserve power in mobile device 110.

Figure 5:
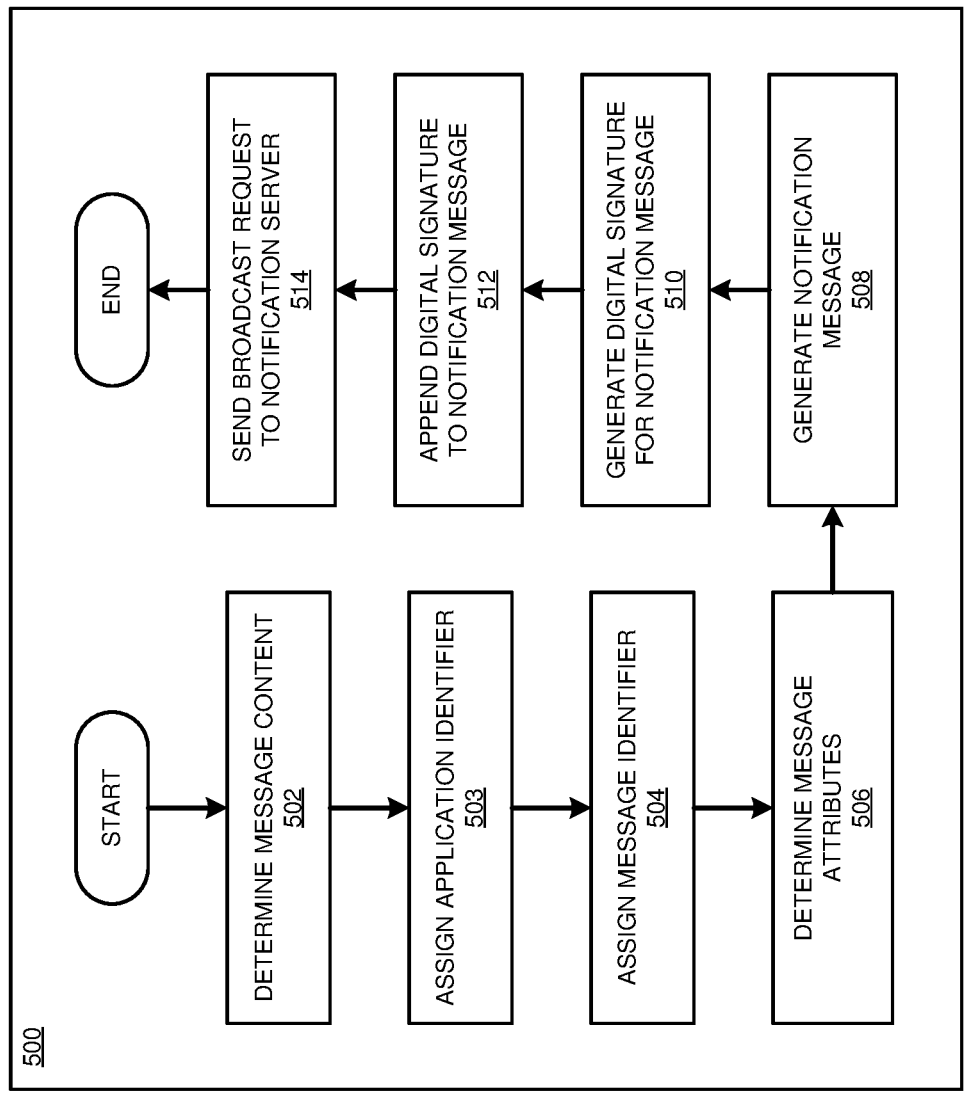
FIG. 5 depicts a flowchart of an example server process for delivering messages to offline devices using peer-to-peer communication in accordance with an illustrative embodiment.

With reference to FIG. 5, this figure depicts a flowchart of an example server process for delivering messages to offline devices using peer-to-peer communication in accordance with an illustrative embodiment. In one or more embodiments, process 500 can be implemented in server application 306 of message source server 104 in FIG. 1.

In block 502, server application 306 determines message content, such as a severe weather alert received from an emergency weather source, to be broadcast in a notification message. In block 503, server application 306 assigns an application identifier to the message identifying a particular client application for which the message is intended. In block 504, server application 306 assigns a unique message identifier to the message. In block 506, server application 306 determines message attributes to be included in the message. In one or more embodiments, the message attributes specifying qualifying attributes of targeted recipient devices such as conditions or other characteristics that are determinative of whether or how frequently the message is to be forwarded by a mobile device. In particular embodiments, the message attributes may include one or more of an intended location or area for which the message is to be forwarded, an identity of a targeted recipient device, a time window or time duration during which the message is to be forwarded, and a specified geographical distance that the message is intended to travel. In one or more embodiments, the message attributes further includes an application identifier indicating an intended client application for the message.

In block 508, server application 306 generates the notification message including the message content, message ID, and message attributes. In block 510, server application 306 generates a digital signature for the notification message using the private key. In block 512, server application 306 appends the digital signature to the notification message to generate a broadcast notification message. In block 514, server application 306 sends a broadcast request including the broadcast notification message to a notification server, such as push notification server 106. In the embodiment, the broadcast request includes a request for the notification server to broadcast the broadcast notification message to one or more mobile devices. The process 500 then ends.

Figure 6:
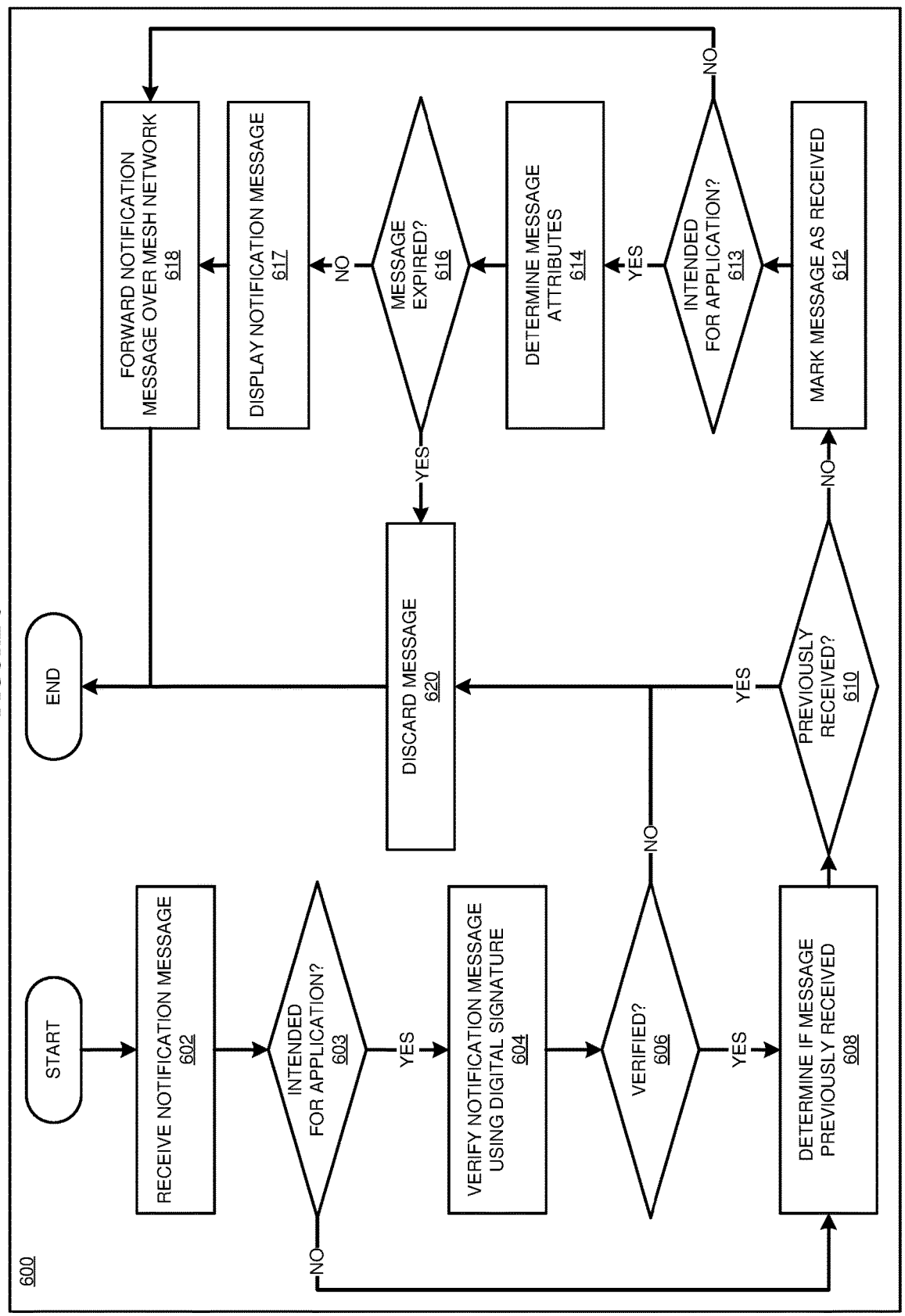
FIG. 6 depicts a flowchart of an example client process for delivering messages to offline devices using peer-to-peer communication in accordance with an illustrative embodiment.

With reference to FIG. 6, this figure depicts a flowchart of an example client process for delivering messages to offline devices using peer-to-peer communication in accordance with an illustrative embodiment. In one or more embodiments, process 600 can be implemented in client application 412 of one or more of mobile devices 110A-110K in FIG. 1.

In block 602, client application 412 receives a notification message including the broadcast notification message generated by a server such as message source server 104. In one or more embodiments, the broadcast notification message is received from a notification server via a cellular network and/or a peer mobile device via a peer-to-peer mesh network communication. In block 603, client application 412 determines whether the broadcast notification message is intended for client application 412. In one or more embodiments, the broadcast notification message includes an application identifier and client application determines whether the application identifier is associated with client application 412 to determine whether the broadcast notification message is intended for client application 412. If client application 412 determines that the message is intended for client application 412, process 600 continues to block 604. If client application 412 determines that the broadcast notification message is not intended for client application 412, client application 412 does not have access to the public key corresponding to the server that generated the notification message, and process 600 continues to block 608 as further described below. In block 604, client application 412 verifies the integrity of message content in the notification message and the original sender of the notification message using the digital signature contained within the notification message and a public key held by client application 412. In block 606, client application 412 determines whether the notification message is verified. If the notification message is verified, in block 608 client application 412 determines whether the notification message has been previously received by client application 412. In block 610, if the message has not been previously received the process 600 proceeds to block 612.

In block 612, client application 412 marks the notification message as received. In block 613, if the client application 412 has determined in block 603 that the broadcast notification message is intended for client application 412, the process 600 proceeds to block 614. If client application 412 has determined that the client application 412 has determined in block 603 that the broadcast notification message is not intended for client application 412, the process 600 proceeds to block 618 as further described below.

In block 614, client application 412 determines message attributes from the notification message. In particular embodiments, the message attributes specifying qualifying attributes of targeted recipient devices such as application identifier, conditions or other characteristics that determine whether or how frequently the message is to be broadcast by a mobile device or if the message should be expired based upon the message attributes.

In block 616, client application 412 determines if the notification message has expired based upon the message attributes. In particular embodiments, messages may expire after a predetermined period of time regardless of whether the message attributes indicate the notification message should be expired. If the notification message has not expired, process 600 continues to block 617. In block 617, client application 412 displays the notification message contents to a user of mobile device 110 and process 600 continues to block 618. In one or more embodiments, mobile device 110 may further display indicators regarding whether or not the message was received via a mesh network. In one or more embodiments, mobile device 110 may further display one or more of the message attributes. In block 618, client application 412 broadcasts the notification message over a peer-to-peer mesh network channel via the mobile device. In particular embodiments, the mesh network broadcast uses a WiFi channel, a Bluetooth channel, or other limited range radio communication channel. The process 600 then ends.

If the notification message is determined to not be verified in block 606, the message is determined to be previously received in block 610, or the message is determined to be expired in block 616, process 600 continues to block 620. In block 620, client application 412 discards the message and process 600 ends.

In one or more embodiments, client application 412 continues to receive and forward messages over peer-to-peer channels even when client application 412 is not being actively used or when the mobile device is in a lower power consumption mode such as a display screen of the mobile device being turned off. In one or more embodiments, the peer-to-peer protocols and Internet protocols operate simultaneously on the same mobile device without interfering with one another. In particular embodiments, a user choosing to enable the mesh network does not prevent connection of the mobile device to the Internet at the same time.

In one or more embodiments, the message attributes of a message further include a list of targeted recipient devices of the message. In particular embodiments, a message may be intended to be private and targeted to one or more devices. In such an embodiment, a server encrypts the message content using public keys of each of the target recipients in addition to adding the digital signature to the message. In the embodiment, peer devices that are not a target recipient continue to forward the message along and can verify the signature and make decisions about validity based on other attributes, but cannot decrypt the message contents. In the embodiment, the target recipients are the only devices that can decrypt the message using the private key associated with the target device. In particular embodiments, a targeted recipient device registers with a service in advance and exchanges public keys with the service to be able to use the public keys for encryption in the future.

Thus, a computer implemented method, system or apparatus, and computer program product are provided in the illustrative embodiments for delivering messages to offline devices using peer-to-peer communication and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

receiving, by a communication device via a cellular network, a notification message, the notification message including a message identifier and a digital signature generated by an original sender of the notification message, wherein the receiving includes storing the notification message in a message store on the communication device;

holding a public key in a client application, the public key corresponding to a private key held by the original sender of the notification message;

determining that an integrity of message content in the notification message and the original sender of the notification message is verified using the digital signature and the public key;

determining whether the notification message received by the communication device and stored in the message store of the communication device has been previously received;

marking, responsive to determining that the notification message has not been previously received, the notification message as received, wherein the notification message further includes at least one message attribute, the at least one message attribute specifying qualifying attributes of an intended recipient of the notification message that are determinative of whether or how frequently the notification message is to be forwarded, wherein the at least one message attribute comprises a geographic area to which the message is to be forwarded;

receiving, prior to receiving the notification message, an indication of an expected time window of receiving the notification message;

adjusting at least one of a frequency for discovery of the notification message and a frequency of forwarding of the notification message based upon the expected time window;

forwarding, upon determining that the notification message is to be forwarded and has been verified, the notification message by the communication device; and discarding, upon determining that the notification message is not to be forwarded, the notification message, based on a geographical distance of the notification message from a location of a first recipient of the notification message exceeding a specified geographical distance, wherein the communication device broadcasts the notification message using a broadcast protocol to forward the notification message to other devices using a peer-to-peer communication channel over a mesh network.

2. The method of claim 1, wherein the notification message further includes an application identifier generated by the original sender, the application identifier associated with an application of the communication device.

3. The method of claim 2, further comprising:

determining that the notification message is intended for the application based upon the application identifier, wherein the determining that the integrity of message content is verified is responsive to the determining that the notification message is intended for the application.

4. The method of claim 1, further comprising:

determining that the notification message has not previously been received based upon the message identifier; and marking the notification message as received.

5. The method of claim 1, further comprising:

determining the peer-to-peer communication channel based upon an expected latency of the notification message.

6. The method of claim 1, further comprising:

displaying the message content of the notification message.

7. The method of claim 1, further comprising:

dynamically adjusting a frequency of forwarding of the notification message to conserve power of the communication device.

8. The method of claim 1, wherein the original sender includes a source server, wherein the receiving of the notification message includes receiving the notification message as a push notification sent via the cellular network.

9. The method of claim 8, wherein the communication device is a mobile device simultaneously operating an Internet protocol and a peer-to-peer protocol.

10. A computer usable program product comprising one or more computer-readable storage devices, and program instructions stored on at least one of the one or more storage devices, the stored program instructions comprising:

program instructions to receive, by a communication device via a cellular network, a notification message, the notification message including a message identifier and a digital signature generated by an original sender of the notification message, wherein the receiving includes storing the notification message in a message store on the communication device;

program instructions to hold a public key in a client application, the public key corresponding to a private key held by the original sender of the notification message;

program instructions to determine that an integrity of message content in the notification message and the original sender of the notification message is verified using the digital signature and the public key;

program instructions to determine whether the notification message received by the communication device and stored in the message store of the communication device has been previously received;

program instructions to mark, responsive to determining that the notification message has not been previously received, the notification message as received, wherein the notification message further includes at least one message attribute, the at least one message attribute specifying qualifying attributes of an intended recipient of the notification message that is determinative of whether or how frequently the notification message is to be forwarded, wherein the at least one message attribute comprises a geographic area to which the message is to be forwarded;

program instructions to receive, prior to receiving the notification message, an indication of an expected time window of receiving the notification message;

program instructions to adjust at least one of a frequency for discovery of the notification message and a frequency of forwarding of the notification message based upon the expected time window;

program instructions to forward, upon determining that the notification message is to be forwarded and has been verified, the notification message by the communication device; and program instruction to discard, upon determining that the notification message is not to be forwarded, the notification message, based on a geographical distance of the notification message from a location of a first recipient of the notification message exceeding a specified geographical distance, wherein the program instructions to forward the notification message include program instructions for the communication device to broadcast the notification message using a broadcast protocol to forward the notification message to other devices using a peer-to-peer communication channel over a mesh network.

11. The computer usable program product of claim 10, wherein the program instructions are stored in a computer readable storage device in a data processing system, and wherein the computer usable code is transferred over a network from a remote data processing system.

12. The computer usable program product of claim 10, wherein the program instructions are stored in a computer readable storage device in a server data processing system, and wherein the computer usable code is downloaded over a network to a remote data processing system for use in a computer readable storage device associated with the remote data processing system.

13. The computer usable program product of claim 10, wherein the notification message further includes an application identifier generated by the original sender, the application identifier associated with an application of the communication device.

14. The computer usable program product of claim 13, further comprising program instructions to determine that the notification message is intended for the application based upon the application identifier, wherein the determining that the integrity of message content is verified is responsive to the determining that the notification message is intended for the application.

15. The computer usable program product of claim 10, further comprising:
  program instructions to determine that the notification message has not previously been received based upon the message identifier; and
  program instruction to mark the notification message as received.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
  program instructions to receive, by a communication device via a cellular network, a notification message, the notification message including a message identifier and a digital signature generated by an original sender of the notification message, wherein the receiving includes storing the notification message in a message store on the communication device;
  program instructions to hold a public key in a client application, the public key corresponding to a private key held by the original sender of the notification message;
  program instructions to determine that an integrity of message content in the notification message and the original sender of the notification message is verified using the digital signature and the public key;
  program instructions to determine whether the notification message received by the communication device and stored in the message store of the communication device has been previously received;
  program instructions to mark, responsive to determining that the notification message has not been previously received, the notification message as received,
  wherein the notification message further includes at least one message attribute, the at least one message attribute specifying qualifying attributes of an intended recipient of the notification message that is determinative of whether or how frequently the notification message is to be forwarded, wherein the at least one message attribute comprises a geographic area to which the message is to be forwarded;
  program instructions to receive, prior to receiving the notification message, an indication of an expected time window of receiving the notification message;
  program instructions to adjust at least one of a frequency for discovery of the notification message and a frequency of forwarding of the notification message based upon the expected time window;
  program instructions to forward, upon determining that the notification message is to be forwarded and has been verified, the notification message by the communication device; and
  program instruction to discard, upon determining that the notification message is not to be forwarded, the notification message, based on a geographical distance of the notification message from a location of a first recipient of the notification message exceeding a specified geographical distance,
  wherein the program instructions to forward the notification message include program instructions for the communication device to broadcast the notification message using a broadcast protocol to forward the notification message to other devices using a peer-to-peer communication channel over a mesh network.

17. The computer system of claim 16, wherein the notification message further includes an application identifier generated by the original sender, the application identifier associated with an application of the communication device.

18. The computer system of claim 17, further comprising program instructions to determine that the notification message is intended for the application based upon the application identifier, wherein the determining that the integrity of message content is verified is responsive to the determining that the notification message is intended for the application.

19. The computer system of claim 16, further comprising:
  program instructions to determine that the notification message has not previously been received based upon the message identifier; and
  program instruction to mark the notification message as received.

* * * * *